G. C. AYLING.
Surveying Instrument.
No. 22,396.
Patented Dec. 21, 1858.
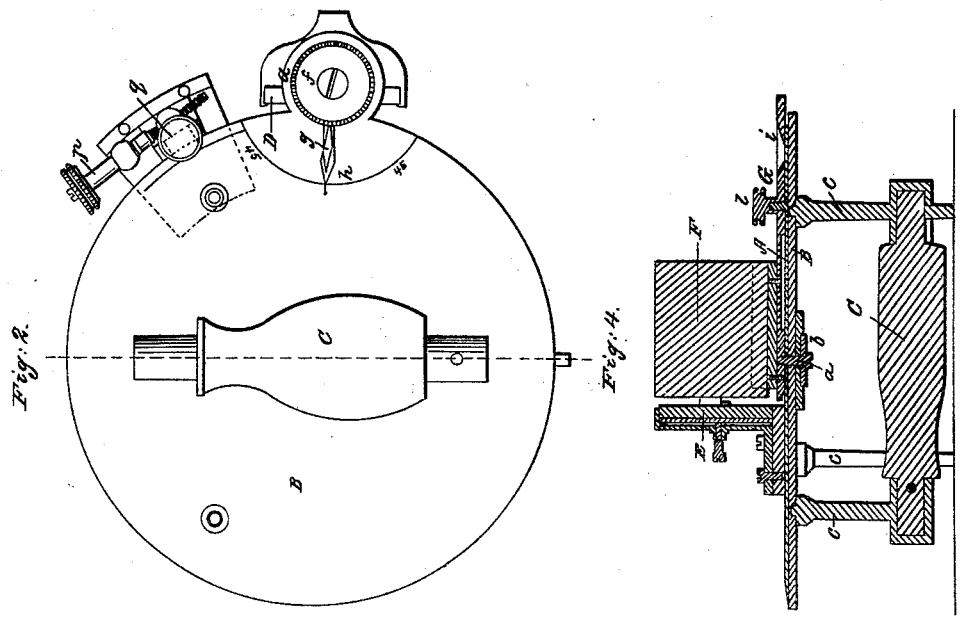
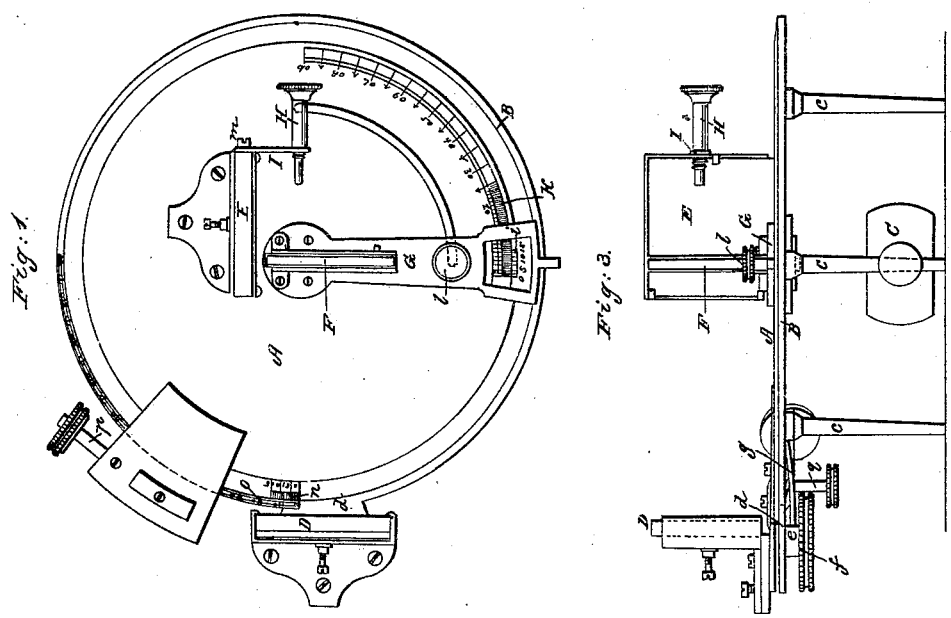

UNITED STATES PATENT OFFICE.

GEO. C. AYLING, OF BOSTON, MASSACHUSETTS, ASSIGNOR TO HIMSELF AND HENRY A. AYLING, OF SAME PLACE.

INSTRUMENT FOR MEASURING ALTITUDES, &c.

Specification of Letters Patent No. 22,396, dated December 21, 1858.

*To all whom it may concern:*

Be it known that I, GEORGE C. AYLING, of Boston, in the county of Suffolk and State of Massachusetts, have invented an Improved Angle-Meter or Instrument for Measuring Angles by Reflection; and I do hereby declare that the same is fully described and represented in the following specification and the accompanying drawings, of which—

Figure 1 denotes a top view of the said instrument; Fig. 2, an underside or bottom view of it; Fig. 3, a side elevation, and Fig. 4, a longitudinal section of it.

My said instrument is for the same purposes and contains the same essential elements or features as that described in the United States Patent No. 15162. I have however made a different construction and arrangement of the parts and applied thereto others by which the instrument is not only brought into a more convenient form for use, but can be more extensively employed in the measurement of horizontal angles as well as those of altitude. The principal novel feature of my instrument by which it is to be distinguished from that described in the said patent is to be found, not only in an arrangement of the index glass with respect to the detector glass so as to enable the latter to be moved either into parallelism with or at right angles to the former but in the addition not only of an index or vernier to the detector arm but a divided arc therefor to the index plate or that which supports the index glass.

In carrying out my improvement, I make use of two circular plates, disks or wheels A, B, one which, viz, A, is placed concentrically on the other (B) and has a journal or pivot, *a*, projecting through a corresponding bearing, *b*, made through the central part of the said plate B. From the rear or underside of the lowermost plate four legs, *c, c, c, c*, project, two of them serving to support a handle, C, which is arranged on them as shown in the drawings. There is a projection, *d*, from the circumference of the said lower plate, such projection serving to support of the journal, *e*, of the horizon glass D, which is made like those of the Hadley sextant. Its arbor is so applied to the plate, B, as to be capable of rotating thereon. A thumb nut, *f*, and an index pointer, *g*, are applied to the arbor the nut being to enable a person to turn the arbor and of course the horizon glass with it. The index pointer operates with a divided arc *h*, made in the back of the plate, B, its use being the same as its equivalent in the quadrant as set forth in the said patent No. 15162, of which I am a proprietor. Instead however of such a mode of applying the horizon glass to the plate, B, it may be fixed thereto as it generally is to the frame of the Hadley quadrant.

The disk or wheel, A, may be termed the index plate. It supports the index mirror or glass E, which is arranged aside from its center so as to enable the detector or unsilvered glass, F, to be turned around either into parallelism with or at right angles to it. This detector glass is mounted on a turning arm, G, whose center of motion coincides with that of the plate, B. This arm carries an index pointer, or a vernier, *i*, which operates with a divided arc, *k*, arranged on the upper plate, A. The arm of the detector has a clamp screw, *l*, applied to it for fastening it in position. If desirable, it may have the ordinary clamp and tangent screws by which its adjustment may be accurately effected. The horizon glass is made like those of the Hadley sextant or quadrant, that is it is partly silvered.

H, represents an eye piece or tube applied to the index glass or an arm, I, swinging on a screw or pin, *m*, extending therefrom.

The index plate, A, has a vernier, *n*, to operate with a divided arc, *o*, made on the plate, B, and both plates are provided with clamp and tangent screws as shown at *p*, *q*. Each divided arc of the instrument is 90° or more in length.

The advantages gained by my improvement, are a greater range of movement for the detector glass and a registry of its movements. Furthermore, the instrument is brought into a more compact and convenient form, and by means of the additional vernier and its divided arc, when used in connection with the primary arc and vernier, as they can be, angles through the entire circle or 360° can be taken, whereas, with the arrangement shown in the Hedgecock quadrant angles less than 180° only can be obtained.

I do not claim the combination of the detector glass with the index and horizon glasses, but What I do claim is—

The arrangement of the index glass with respect to the detector glass so as to enable the latter to be moved either into parallelism with or at right angles to the former, and combining with the detector glass and the main divided arc and index, a secondary index and divided arc applied to register the movements of the detector glass substantially as described.

In testimony whereof I have hereunto set my signature.

GEO. C. AYLING.

Witnesses:
R. H. EDDY,
F. P. HALE, Jr.